Nov. 10, 1931.  F. A. BYLES  1,831,553
REGULATING SYSTEM
Filed March 26, 1930
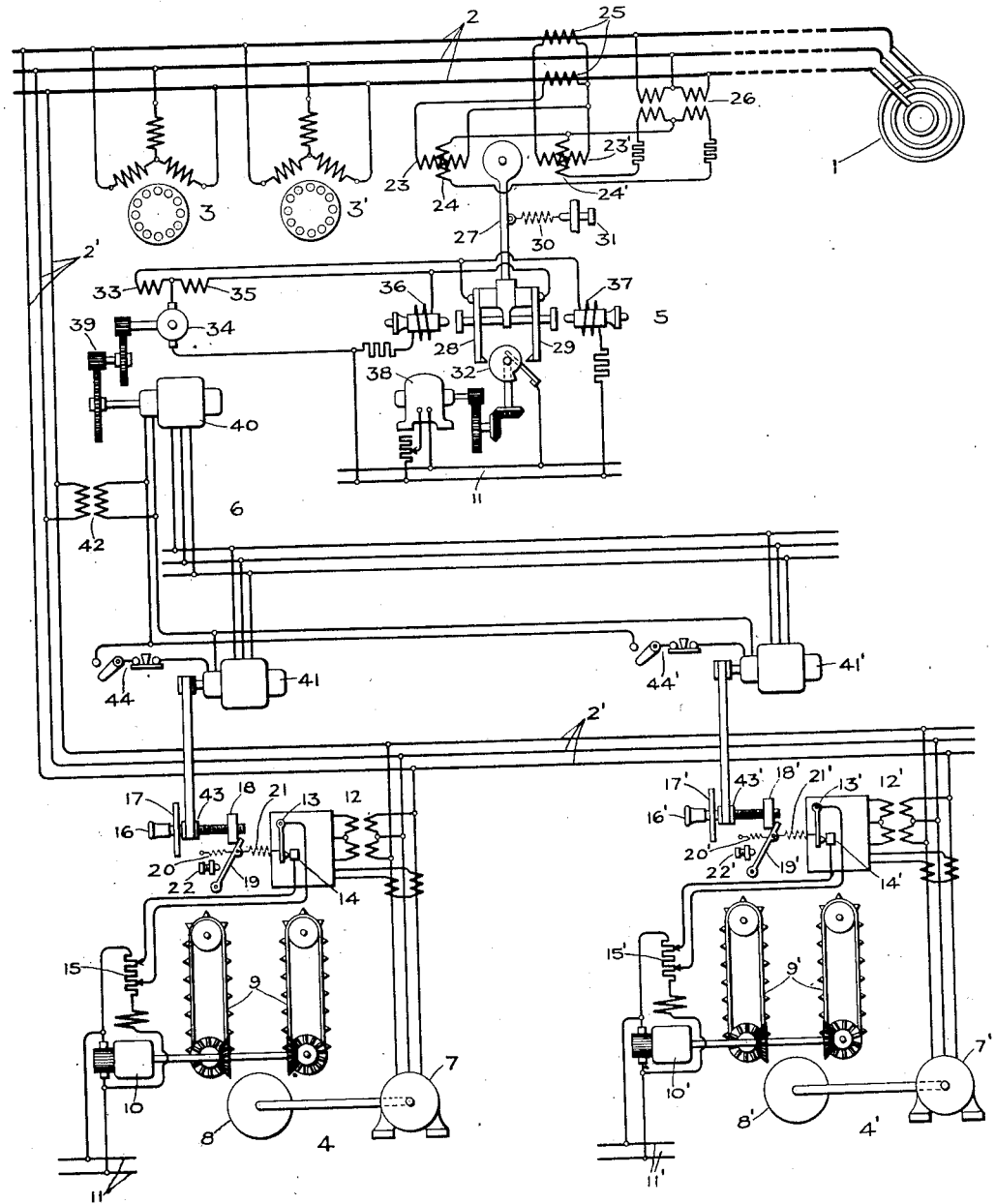
Inventor:
Frank A. Byles,
by Charles E. Tullar
His Attorney.

Patented Nov. 10, 1931

1,831,553

UNITED STATES PATENT OFFICE

FRANK A. BYLES, OF SCOTIA, NEW YORK, ASSIGNOR TO GENERAL ELECTRIC COMPANY, A CORPORATION OF NEW YORK

REGULATING SYSTEM

Application filed March 26, 1930. Serial No. 439,210.

My invention relates to regulating systems and particularly to load regulating systems.

Due to the fact that idle electrical generating apparatus represents an actual monetary loss in interest, depreciation and obsolescence charges, most utility companies, as well as generating stations in general, penalize the commercial purchaser of electrical energy whose maximum power demand as averaged over comparatively short intervals of time, usually fifteen minutes, is appreciably greater than the total average power consumed over a much longer period, such as a day, week, or month. This penalty is in the form of a charge, known as a demand charge, which increases with the divergence between the maximum demand and the total average demand for the greater this divergence the greater the installed capacity of normally idle generating equipment the power company must keep in readiness to supply the peak loads.

As a consequence of the above, commercial consumers of electrical energy find it to their advantage to reduce the magnitude of their peak loads or maximum demands and various automatically operating systems have been devised for accomplishing this purpose. Some of these systems operate to completely shut down one or more load devices if the total consumer load tends to exceed a predetermined amount but there are many consumers, such as manufacturing plants, whose production processes cannot be totally shut down in this manner. Other systems partially reduce the load a predetermined amount on a plurality of load devices at such times but if such systems have a predetermined time feature whereby the reduction in load on certain devices persists for a given time the result is likely to be a valley in the plant's load curve where a peak would have been, while if the time feature is absent the system may have a tendency to hunt. Still other systems operate to reduce the load on a single load device, either in steps or uniformly, just enough to prevent the total plant load from exceeding a predetermined maximum demand, but as the maximum demands often represent a considerable amount of power it may often happen that the amount to which the regulated machine is unloaded may correspond to a virtual shutdown with the ever present possibility of an injurious effect on production or product.

In accordance with my invention I provide a novel load regulating system whereby relatively small increments of load are simultaneously removed or added to a plurality of load devices in such a manner as to keep the total load of a power consumer constant.

An object of my invention is to provide a new and improved electrical load regulating system.

Another object of my invention is to provide a novel combination of means whereby a master controller simultaneously varies the adjustment of a plurality of otherwise independent load regulators, which are associated with a plurality of load devices, in a manner to keep a power consumer's total load substantially constant at all times.

My invention will be better understood from the following description taken in connection with the accompanying drawing, and its scope will be pointed out in the appended claims.

Referring now to the single figure of the accompanying drawing, this illustrates diagrammatically a preferred embodiment of my invention in that it illustrates diagrammatically a paper mill to which my invention is particularly applicable for reasons which will later be pointed out, although it will be obvious to those skilled in the art that my invention is not limited to such an application. For supplying the mill with electrical energy I have shown an alternating current generator 1, which is connected to a power supply circuit 2 and 2'. Drawing power from the circuit are a plurality of load devices illustrated generally as motors 3 and 3' and pulp grinders 4 and 4'. For simultaneously regulating the load on the pulp grinders 4 and 4' I have shown a master power responsive control element 5 connected thereto through suitable telemetric means 6 such as self-synchronous motion transmitting devices or selsyn apparatus. I prefer to use telemetric means of this type rather than to use mechanical motion transmitting means because of the greater flexibility and economy of space of the former which in many mills where the grinders are widely separated from each other and from the main power line are items resulting in a distinct advantage.

As each of the pulp grinders 4 and 4' is identical I will describe only one in detail, designating however similar elements in each by corresponding reference numerals differing only in that the numerals designating the elements of grinder 4' have associated therewith a designating prime. Grinder 4 comprises a motor 7 for operating grinder wheel 8. For feeding the work to grinder wheel 8 are a pair of endless chains 9 which are operated in the proper direction by a small motor 10 which receives its energy from any suitable source such as supply bus 11. The reason that my invention is particularly applicable to pulp mills is that almost all pulp grinders have associated therewith individual load regulating means of one sort or another, so that in applying my invention to such a mill it is not necessary to equip a plurality of load devices with individual load regulators.

The load regulator of grinder 4 comprises a wattmeter element 12 which is connected in the usual manner to the input circuit of motor 7. In this instance the pointer of the wattmeter 12 consists of a movable contact member 13 which cooperates with a fixed contact 14. These contacts are connected across a resistance 15 in the field circuit of motor 10 so that by their engagement or disengagement the speed of motor 10 and consequently the load on motor 7 is varied.

For adjusting the power at which contact 13 engages contact 14 I have shown a screw 16 which is supported in a bearing member 17 so that it may be turned on its axis but cannot move longitudinally. On this screw is a nut 18 which cooperates with a pivoted member 19, the latter being urged into engagement with the former by means of a spring 20. A second spring 21 is connected between contact arm 13 and pivoted lever 19, spring 20, however, being considerably stronger than spring 21. Thus by turning screw 16 nut 18 will move longitudinally thereof and as spring 21 is overpowered by spring 20 arm 19 will follow the nut, thereby providing a means for adjusting the tension of spring 21, or in other words, the load on grinder motor 7 at which contacts 13 and 14 engage. This is because engagement of contacts 13 and 14 short circuits resistance 15, thus reducing the speed of motor 10 and hence the load on the grinder. An adjustable stop 22 is provided for limiting the counter-clockwise movement of lever 19 and thus for limiting the maximum power which the regulator can hold on the grinder.

I will next describe the master power responsive element 5. This device is described in detail and claimed in my prior Patent 1,713,168, which is assigned to the same assignee as this application, so that a very detailed description of it will not be given. It comprises essentially an induction type wattmeter having current coils 23 and 23' and potential coils 24 and 24' connected to circuit 2 through current and potential transformers 25 and 26 respectively. Movable element 27 of this meter carries a pair of relatively insulated contacts 28 and 29 for cooperation with a rotatable cam contact 32. Opposing the torque of element 27 is a spring 30 whose tension is adjustable by a screw 31. Connected to contact 28 is field winding 33 of a reversible pilot motor 34, while connected to contact 29 is a field winding 35. A pair of holding coils 36 and 37 are connected respectively across contacts 29—32 and 28—32. A motor 38 connected through suitable driving mechanism to cam 32 serves to rotate this cam. Motors 34 and 38 and holding coils 36 and 37 are all energized from a suitable source of current such as bus 11.

For changing the load on grinders 4 and 4' in response to changes in the total load of all the load devices connected to circuit 2, as reflected by element 5, I provide telemetric means of any suitable type, although preferably of the well-known self-synchronous dynamo-electric type. Thus, one of these telemetric devices 40, acting as a transmitter, is connected through suitable mechanism 39 to the motor 34 while similar devices 41 and 41' acting as receivers are connected through any suitable power transmitting means such as belts or chains to screws 16 and 16' which are equipped with corresponding pulleys or sprockets 43 and 43'.

Elements 40, 41, 41' are of such well known construction that it is not thought necessary to describe them in detail. They usually comprise a three-phase stator element and a bipolar rotor element which is energized by a single-phase alternating current source.

The excitation of these telemetric devices is obtained from one of the phases of circuit 2' through a suitable transformer 42. Switching mechanisms 44 and 44' are provided for the purpose of rendering receiving devices 41 and 41' inactive whenever desired.

The operation of my invention is as follows: Let it be assumed that generator 1 is being operated by a suitable prime mover (not shown) and that load devices 3, 3', 4 and 4' are all in operation. Under these circumstances load devices 4 and 4' will each require a substantially constant amount of power due to the action of their respective regulators, while load devices 3 and 3' will require varying amounts of power, depending upon the loads which are placed upon them. If the total load on all of the load devices should now tend to exceed a predetermined amount or maximum demand as determined by the adjustment of spring 30 the element 27 will turn in a clockwise direction until contacts 29 and 32 engage. When this happens a circuit is completed through these contacts and holding coil 36, thereby increasing the contact pressure between contacts 29 and 32. At the same time a circuit is completed through these contacts, field winding 35 and the armature of motor 34 thereby causing this motor to turn in one direction. Likewise if the power flow through circuit 2 is less than a predetermined amount contacts 28 and 32 will engage to energize holding coil 37, and motor 34 through the field winding 33 thereby causing this motor to turn in the opposite direction. The function of the rotatable cam is to provide means for periodically breaking these circuits so that arm 27 may assume a new position in response to changes in power conditions on circuit 2, which otherwise it would be unable to do because the holding coils greatly overpower its torque. The holding coils, however, are necessary to insure a firm contact pressure regardless of how little the power flow through circuit 2 diverges from a predetermined amount. At this point it might be well to note, however, that although I have shown and described an improved type of power responsive contact making apparatus my invention is not so limited and so far as its principle of operation is concerned contact 32 might just as well be stationary and holding coils 36 and 37 be dispensed with.

As motor 34 turns in opposite directions, depending upon whether the power flow through circuit 2 is greater or less than a predetermined amount, transmitter 40 will of course also act in the same manner and likewise receiving devices 41 and 42 will partake of this motion. Therefore adjusting screws 16 and 16′ will be turned simultaneously to vary the setting of their respective load regulators in response to variations in the total power flow through circuit 2 and if a considerable number of load devices, such as the grinders shown, are so regulated the change in load on each individual load device can be made relatively small, although the total regulating range of the system as a whole will be ample to prevent peak loads occurring on the system.

While I have shown and described a particular embodiment of my invention it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, a power supply circuit, a plurality of load devices connected thereto, individual load regulators associated with a plurality of said load devices, each of said regulators having load adjusting means including tensioned resilient elements, master regulating means associated with said circuit, and electrically connected dynamo-electric machines associated with said master regulating means and with each of said individual regulators for simultaneously operating a plurality of said adjusting means by varying the tension of said resilient elements in a manner to maintain a constant load on said circuit.

2. In combination, a source of electrical energy, a supply circuit connected thereto, a plurality of regulated load devices connected to said circuit, a plurality of unregulated load devices connected to said circuit, said regulated load devices having associated therewith individual load regulators, movable load adjusting means associated with each of said regulators, a master power responsive means associated with said circuit, said means having an element which is movable in response to variations in the power flow through said circuit, and telemetric means connecting said movable element and said movable load adjusting means.

3. In combination, a source of electrical energy, a supply circuit connected thereto, a plurality of load devices connected to said circuit, individual load regulators associated with some of said load devices, said regulators having rotatable load adjusting means, means connected to be responsive to the power flow through said circuit, including an element which is rotatable in different directions depending upon whether the power flow through said circuit is greater or less than a predetermined amount, and dynamo-electric telemetric means connecting said rotatable element to said rotatable adjusting means.

4. In combination, a source of electrical energy, a supply circuit connected thereto, load devices, including a plurality of motor operated load devices, connected to said circuit, and means including total load actuated contacts with intermittently energized holding coils associated therewith for simultaneously varying the load on said motor operated load devices in inverse proportion to changes in the total load on all of said load devices.

5. In combination, a source of alternating current electrical energy, a supply circuit connected thereto, load devices, including a plurality of synchronous motor operated load devices connected to said circuit, individual load regulators associated with each of said motor operated load devices, manually operable means for individually adjusting the loads maintained by each of said regulators, and means including telemetric devices for simultaneously operating all of said adjusting means in response to variations in the total amount of power required by all of said load devices in such a manner as to tend to maintain said power constant.

6. In combination, a source of electrical energy, a supply circuit connected thereto, load devices, including a plurality of motor operated load devices, individual load regulators having load adjusting means associated with each of said motor operated load devices, means responsive to the power flow through said circuit for intermittently making and breaking one or the other of two circuits depending upon whether said power flow is above or below a predetermined amount, a reversible pilot motor connected to said circuits, and self-synchronous dynamo-electric motion transmitting means connected between said pilot motor and said adjusting means.

7. A load regulating system comprising, in combination, a source of alternating current, a load circuit connected thereto, load devices, including a plurality of synchronous motor operated pulp grinders, connected to said circuit, individual load regulators associated with each of said grinders, manually operable means on each regulator for adjusting the load held by each of said regulators, means associated with each regulator for limiting the maximum load its associated regulator can hold, a contact making watt responsive device connected to said circuit, a reversible pilot motor having two operating circuits, said contact making watt responsive device being connected to complete one of said circuits at a time depending upon whether the power flow through said circuit is above or below a predetermined amount, circuit controlled holding means for increasing the contact pressure of said device after it completes an operating circuit, means for periodically breaking the completed operating circuit and the holding means circuit, and self-synchronous dynamo-electric telemetric means connecting the rotor of said reversible motor and the adjusting means of said regulators.

In witness whereof I have hereunto set my hand this 25th day of March, 1930.

FRANK A. BYLES.

DISCLAIMER 1,831,553.—*Frank A. Byles*, Scotia, N. Y. REGULATING SYSTEM. Patent dated November 10, 1931. Disclaimer filed May 23, 1933, by the assignee, *General Electric Company*.

Hereby enters the following disclaimer to claims 2 and 5 of the said Letters Patent, which are in the following words, to wit:

"2. In combination, a source of electrical energy, a supply circuit connected thereto, a plurality of regulated load devices connected to said circuit, a plurality of unregulated load devices connected to said circuit, said regulated load devices having associated therewith individual load regulators, movable load adjusting means associated with each of said regulators, a master power reponsive means associated with said circuit, said means having an element which is movable in response to variations in the power flow through said circuit, and telemetric means connecting said movable element and said movable load adjusting means."

"5. In combination, a source of alternating current electrical energy, a supply circuit connected thereto, load devices, including a plurality of synchronous motor operated load devices connected to said circuit, individual load regulators associated with each of said motor operated load devices, manually operable means for individually adjusting the loads maintained by each of said regulators, and means including telemetric devices for simultaneously operating all of said adjusting means in response to variations in the total amount of power required by all of said load devices in such a manner as to tend to maintain said power constant."

[*Official Gazette June 20, 1933.*]